United States Patent
Kim et al.

(10) Patent No.: US 12,027,720 B2
(45) Date of Patent: Jul. 2, 2024

(54) BATTERY PACK COVER HAVING UNEVEN SURFACE STRUCTURE AND BATTERY PACK COMPRISING SAME

(71) Applicant: LG ENERGY SOLUTION, LTD., Seoul (KR)

(72) Inventors: Kyung Mo Kim, Daejeon (KR); Jeong Oh Moon, Daejeon (KR); Su Hang Lee, Daejeon (KR); Ho June Chi, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 495 days.

(21) Appl. No.: 17/311,839

(22) PCT Filed: Aug. 7, 2020

(86) PCT No.: PCT/KR2020/010475
§ 371 (c)(1),
(2) Date: Jun. 8, 2021

(87) PCT Pub. No.: WO2021/025520
PCT Pub. Date: Feb. 11, 2021

(65) Prior Publication Data
US 2022/0021066 A1    Jan. 20, 2022

(30) Foreign Application Priority Data
Aug. 7, 2019    (KR) .......... 10-2019-0095996

(51) Int. Cl.
*H01M 50/271*    (2021.01)
*H01M 50/204*    (2021.01)
*H01M 50/262*    (2021.01)

(52) U.S. Cl.
CPC ....... *H01M 50/271* (2021.01); *H01M 50/204* (2021.01); *H01M 50/262* (2021.01)

(58) Field of Classification Search
CPC . H01M 50/271; H01M 50/262; H01M 50/204
See application file for complete search history.

(56) References Cited

U.S. PATENT DOCUMENTS

| 5,534,364 A | 7/1996 | Watanabe et al. |
| 9,012,051 B2 | 4/2015 | Lee et al. |

(Continued)

FOREIGN PATENT DOCUMENTS

| CN | 200969361 Y | 10/2007 |
| CN | 103636029 A | 3/2014 |

(Continued)

OTHER PUBLICATIONS

International Search Report for PCT/KR2020/010475 dated Dec. 2, 2020.

(Continued)

*Primary Examiner* — Olatunji A Godo
(74) *Attorney, Agent, or Firm* — Birch, Stewart, Kolasch & Birch, LLP

(57) ABSTRACT

A battery pack cover has irregularities formed on an upper surface portion thereof. The battery pack cover effectively prevents stress from being concentrated on a specific area, enables rigidity enhancement without adding a separate bracket, and is easily assembled when applied to packaging.

16 Claims, 6 Drawing Sheets

(56) References Cited

U.S. PATENT DOCUMENTS

| | | |
|---|---|---|
| 9,660,233 B2 | 5/2017 | Kim et al. |
| 2010/0000816 A1 | 1/2010 | Okada |
| 2016/0164053 A1 | 6/2016 | Lee et al. |
| 2016/0254505 A1 | 9/2016 | Eom et al. |
| 2017/0200928 A1* | 7/2017 | Yi ................... H01M 50/289 |
| 2018/0175339 A1 | 6/2018 | Motohashi et al. |
| 2020/0176745 A1 | 6/2020 | Lee |

FOREIGN PATENT DOCUMENTS

| | | |
|---|---|---|
| CN | 104919821 A | 9/2015 |
| CN | 208014769 U | 10/2018 |
| CN | 208240756 U | 12/2018 |
| CN | 109149004 A | 1/2019 |
| EP | 2 999 024 A1 | 3/2016 |
| EP | 3 454 391 A1 | 3/2019 |
| FR | 3 062 521 A1 | 8/2018 |
| JP | 2006-264717 A | 10/2006 |
| JP | 2012-253019 A | 12/2012 |
| JP | 2013-201112 A | 10/2013 |
| JP | 2017-10777 A | 1/2017 |
| JP | 6058163 B2 | 1/2017 |
| KR | 10-2009-0000397 A | 1/2009 |
| KR | 10-2010-0005666 A | 1/2010 |
| KR | 10-2012-0117521 A | 10/2012 |
| KR | 10-2013-0101768 A | 9/2013 |
| KR | 10-2013-0108690 A | 10/2013 |
| KR | 10-2013-0110246 A | 10/2013 |
| KR | 10-2015-0015179 A | 2/2015 |
| KR | 10-2015-0022389 A | 3/2015 |
| KR | 10-2016-0071900 A | 6/2016 |
| KR | 10-2018-0059146 A | 6/2018 |
| KR | 10-2019-0054709 A | 5/2019 |
| WO | WO 2012/140727 A1 | 10/2012 |
| WO | WO 2014/185568 A1 | 11/2014 |

OTHER PUBLICATIONS

Extended European Search Report for European Application No. 20850033.0, dated Mar. 9, 2022.

Japanese Office Action for Japanese Application No. 2021-532092 dated Jun. 6, 2022, with English translation.

* cited by examiner

[FIG. 1]
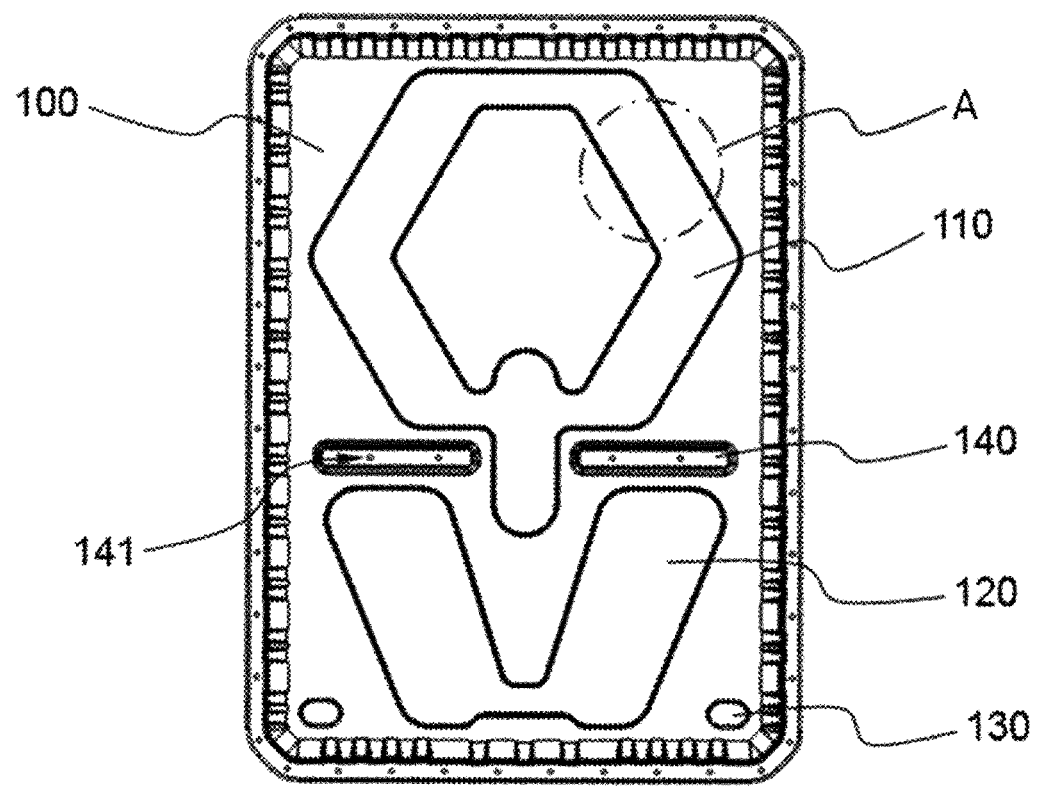

[FIG. 2]
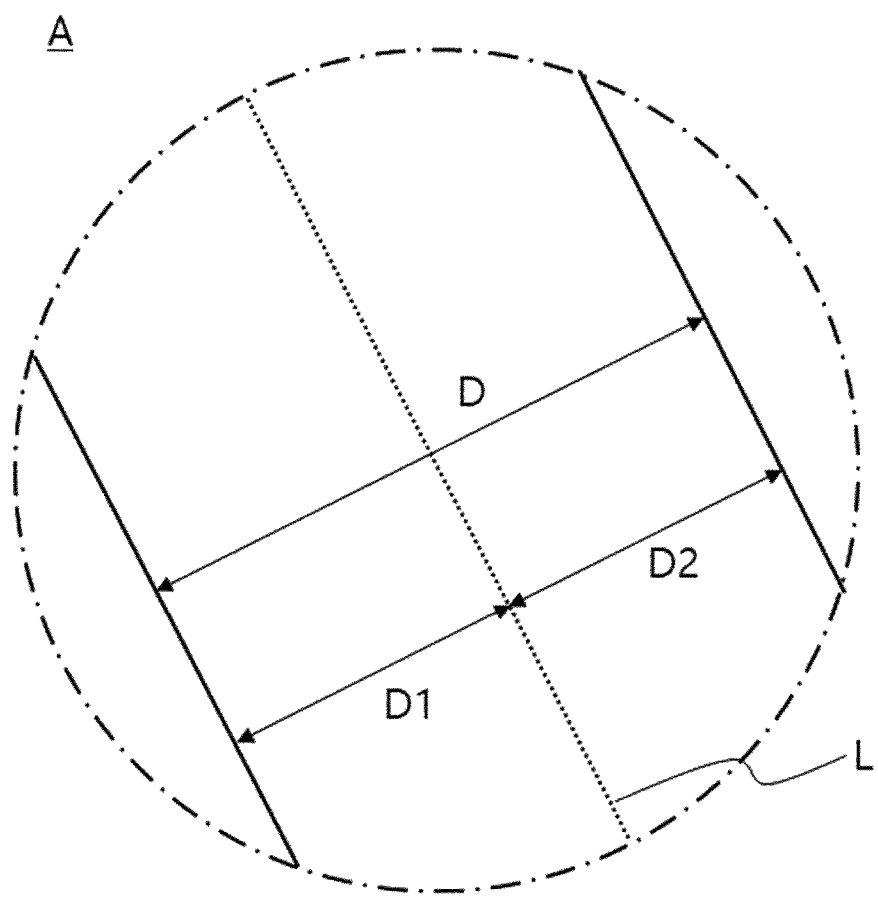

[FIG. 3]
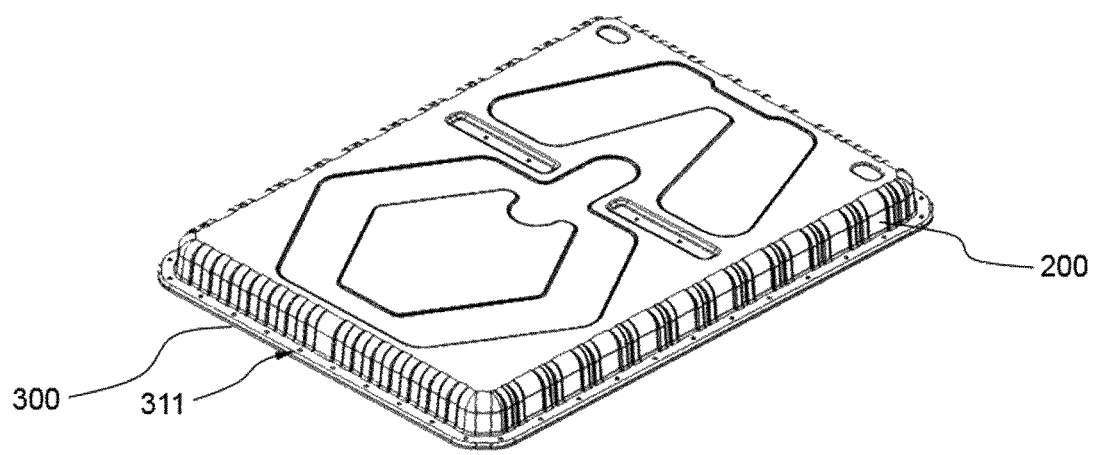

[FIG. 4]
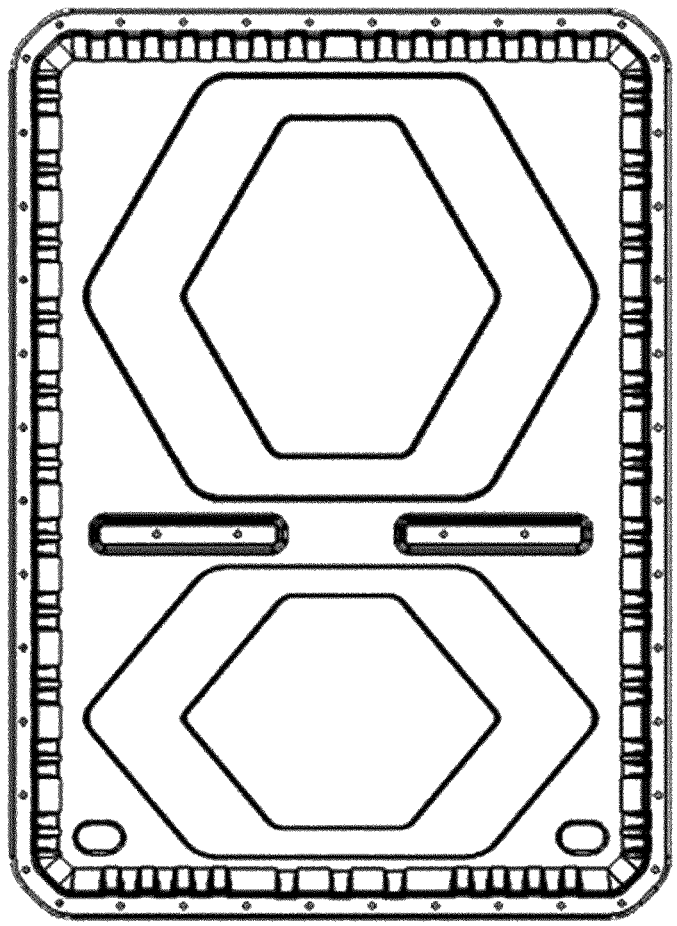
[FIG. 5]

[FIG. 6]
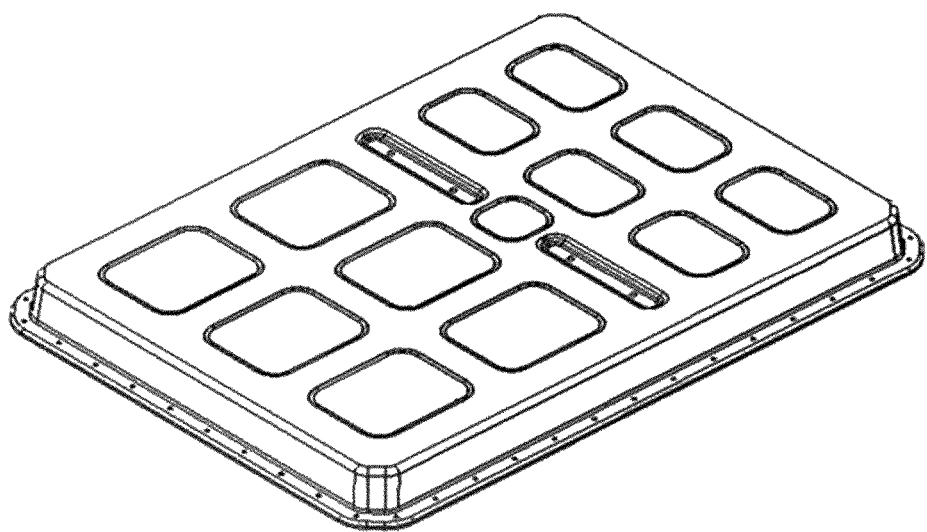

【FIG. 7】
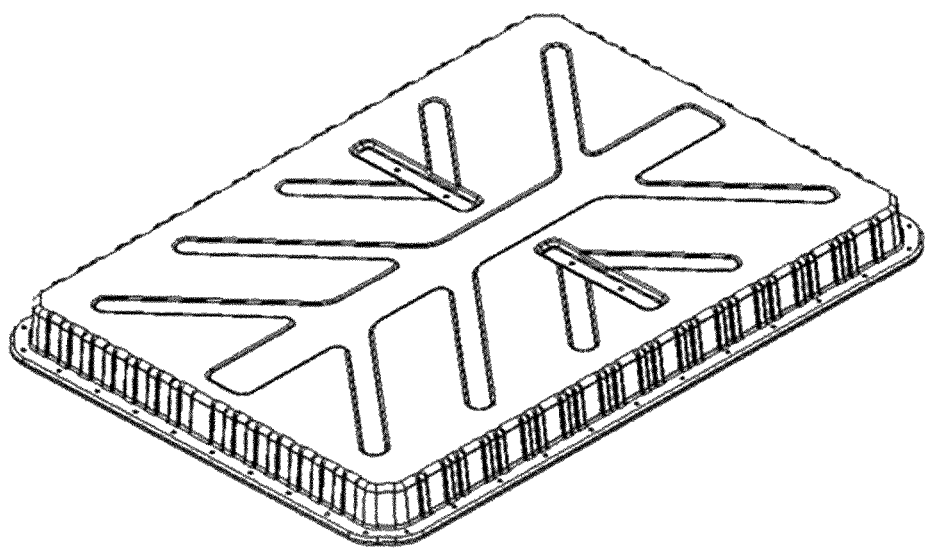
【FIG. 8】
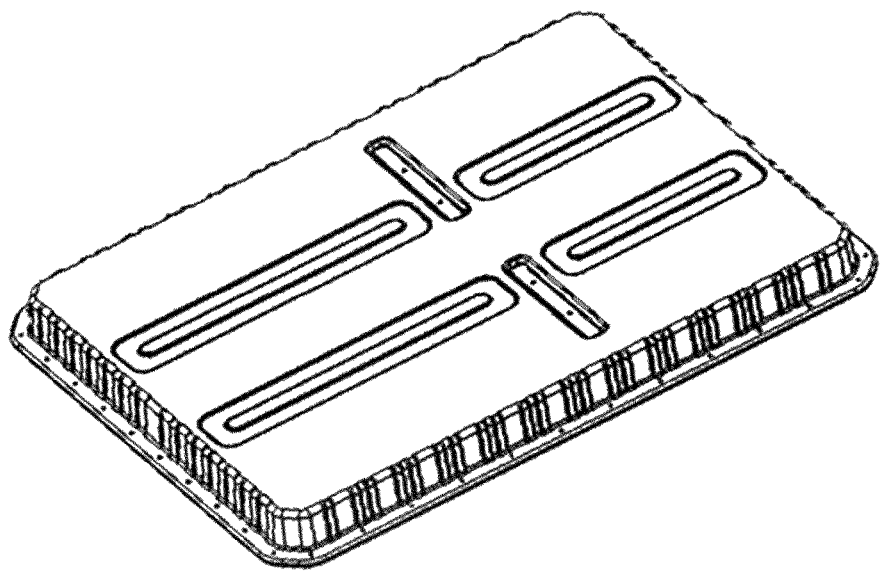

BATTERY PACK COVER HAVING UNEVEN SURFACE STRUCTURE AND BATTERY PACK COMPRISING SAME

TECHNICAL FIELD

This application claims the benefit of priority based on Korean Patent Application No. 10-2019-0095996, filed on Aug. 7, 2019, and the entire contents of the Korean patent application are incorporated herein by reference.

The present invention relates to a battery pack cover having surface irregularities and a battery pack including the same.

BACKGROUND ART

Recently, secondary batteries capable of charging and discharging have been widely used as energy sources of wireless mobile devices. In addition, the secondary battery has attracted attention as a power source of an electric vehicle (EV), a hybrid electric vehicle (HEV), etc., which are proposed as a solution for air pollution of existing gasoline vehicles and diesel vehicles using fossil fuel.

Therefore, the types of applications using the secondary battery are currently much diversified due to the advantages of the secondary battery, and it is expected that the secondary battery will be applied to many fields and products in the future.

In small mobile devices, one or a small number of battery cells are used per device, whereas in medium-large-sized devices such as automobiles, due to the necessity of high power and large capacity, a medium-to-large battery module electrically connected to a plurality of battery cells is used.

Since the size and weight of the battery module is directly related to the storage space and output of the medium and large-sized device, manufacturers are trying to manufacture a battery module that is as small as possible and lightweight. In addition, devices that receive a lot of shock and vibration from the outside, such as electric bicycles and electric vehicles, should have stable electrical connection and physical coupling between the elements constituting the battery module and should implement high output and large capacity by using a large number of batteries. As such, the safety is also becoming important.

Since the medium and large battery modules are preferably manufactured with a small size and weight as possible, prismatic batteries and pouch-type batteries that can be charged with a high degree of integration and have a small weight to capacity are mainly used as battery cells of the medium and large battery modules.

However, when a medium or large battery module is configured using a plurality of battery cells or a medium or large battery module is configured using a plurality of unit modules composed of a predetermined unit of battery cells, a packaging process for mechanically fastening the battery cells is performed.

In particular, in the case of a device, to which an external force such as vibration or shock is applied continuously or repeatedly, such as a vehicle, it is required to apply a packaging member that can effectively protect a battery cell or a battery module.

Therefore, there is a high need for a technology that applies a battery pack member that has no difficulty in the manufacturing process, complements the low mechanical rigidity of the battery cell, and can prevent damage or short circuit due to external force.

DISCLOSURE

Technical Problem

It is an object of the present invention to solve the above-mentioned problems of the prior art and the technical problems required from the past. An object of the present invention is to provide a battery pack cover having excellent mechanical stiffness while effectively dispersing the stress concentration applied to the battery pack cover, and a battery pack including the same.

Technical Solution

In order to achieve this object, the present invention provides a battery pack cover formed with irregularities of a specific shape on the upper surface.

In the present invention, irregularity refers to a case in which a recessed and/or protruded area is formed in a reference plane, for example, a case that a recessed portion in which a specific area is recessed or a protrusion in which a specific area is protruded, on a reference plane. In addition, in the present invention, the "center line connecting the centers of the irregularities in the width direction" means a line which, after center points of the length of the irregularities in the width direction are calculated from the irregularities formed in the length direction, is generated by connecting the center points.

The battery pack cover according to the present invention is in the form of a square tray to cover the upper portion of the battery pack. The battery pack cover has a structure that covers the battery pack tray in which the battery modules are accommodated, and can be mechanically fastened to the battery pack tray if necessary. The battery pack cover may include an upper surface portion that is plate-shaped and has irregularities, the irregularities being either recesses or protrusions on one surface or both surfaces of the upper surface portion; and a side portion that is bent and extended from the upper surface portion, forms a plane perpendicular to the upper surface portion, and covers the upper side surface of the battery pack. Further, the irregularities formed on the upper surface portion include an area in which a center line is a straight line, satisfy following conditions 1 to 3.

[Condition 1]

The center line of each irregularity is a straight line, a first end of the center line faces a first side of the four sides of the upper surface portion, and a second end of the center line faces a second side of the upper surface portion. Therefore, an extension of the centerline does not intersect a corner of the upper surface portion.

[Condition 2]

The center line of each of two irregularities is a straight line and are connected, and face two opposite sides of the upper surface portion. Therefore, the two centerlines, which form a V-shape, have an angle between them that is large enough that the centerlines point to opposite sides of the upper surface portion.

[Condition 3]

Ends of a centerline of an irregularity face two adjacent sides among four sides of the upper surface portion.

The battery pack cover according to the present invention satisfies conditions 1 to 3, thereby preventing a phenomenon in which stress is concentrated on a specific part of the battery pack cover under conditions where external force or vibration is applied, and further increasing rigidity without adding a separate bracket. Through the conditions 1 and 3, the irregularities are not concentrated in the edge direction of the upper surface portion. In addition, through the condition 2, for example, a structure, in which irregularities facing different directions are connected, is presented, and through this, there is an effect of dispersing the direction in which the stress is concentrated.

In one example, each of the irregularities formed on the upper surface portion have a bead-shaped recessed shape, and the irregularities have a structure formed on the upper surface of the plate-shaped upper surface portion. That is, the irregularities formed on the upper surface portion may have a structure having recessed irregularities when the battery pack cover is observed from above. The recessed irregularities may have an effect of reducing the volume of the battery pack as compared to the protruding irregularities.

In one example, the irregularities formed on the upper surface portion include a first shape having a closed figure shape and a second shape having an open figure shape. The present invention does not exclude the case where only one of the first shape and the second shape is formed. In the present invention, when the irregularities formed on the upper surface portion include both the first and second shapes, the effect of dispersing the stress is more excellent.

Specifically, in the case of the first shape, a center line connecting the centers in the width direction of the irregularities forms a polygonal structure having four or more sides. The polygonal structure is, for example, a polygonal structure having 4 to 8 sides. In addition, the second shape forms a polygonal structure in which one side is open when centerlines of the second shape are connected. The first shape blocks concentration of stress applied to the battery pack cover to the edge region of the cover, and the second shape serves to disperse a direction in which the stress is concentrated.

In one example, the first shape further includes one or more irregularities that intersects perpendicular to any one or more of the sides of a polygon.

In another example, the first shape and the second shape may have different areas. Specifically, the first shape is formed to have a larger area than the second shape. For example, a ratio of an area of the first shape and an area of the second shape is in the range of 3:1 to 1.2:1, preferably 2:1 to 1.2:1, more preferably 1.5:1 to 1.2:1. The first shape is a closed figure shape, which has an effect of preventing stress from being concentrated in a specific direction.

Further, the irregularities formed on the upper surface portion do not contact the four sides of the upper surface portion. This is to prevent stress from being concentrated in the edge direction of the battery pack cover.

In the irregularities formed on the upper surface portion, an uneven structure having a width of a certain range is connected to form a specific shape or pattern. In one example, the width of the irregularities in the width direction may be formed in a range of 5 to 35% compared to the length of the upper surface portion in the short axis direction. Specifically, the irregularities include a case of having a small width in a width direction; and/or a large width in a width direction. In the case of having a narrow width, the width of the irregularities is in the range of 5 to 15%, preferably 5 to 10%, compared to the length of the upper surface portion in the short axis direction. Further, in the case of having a wide width in the width direction, the width in the width direction of the irregularities is in the range of 15 to 35%, preferably 15 to 25%, compared to the length of the upper surface portion in the short axis direction.

In one example, the area in which the irregularities formed on the upper surface portion of the battery pack are formed is in the range of 30 to 65% of the total area of the upper surface portion. Specifically, the area where the irregularities are formed is in the range of 30 to 60%, preferably 35 to 60%, and more preferably 40 to 50%. By controlling the area, in which the irregularities are formed, within the above range, it is possible to increase the stress dispersion effect.

In the present invention, the upper surface portion of the battery pack may further include one or more bead-shaped recessed portions formed independently of the irregularities described above. For example, one or more of the recessed portions may be formed to be adjacent to the edge of the upper surface portion of the battery pack.

The battery pack cover according to the present invention is in the form of a square tray to cover the upper part of the battery pack, and is bent and extended from the upper surface to form a plane perpendicular to the upper surface, and includes a side portion covering the upper side of the battery pack.

In one example, the side portion may include a corrugated structure oriented in a direction perpendicular to the upper surface portion. Specifically, the side portion includes protrusions and depressions, and the valley formed by the protrusions and depressions is formed in a direction perpendicular to the upper surface portion. Through the uneven structure formed on the side portion, it is possible to supplement the moldability and vertical rigidity of the battery pack cover.

A wing portion that extends from the side portion and forms a plane perpendicular to the side portion may be further included. In this case, the wing portion has a structure in which, for example, a perforation for fastening with a battery pack or a battery pack tray is formed.

In addition, the present invention provides a battery pack including the aforementioned battery pack cover. Specifically, the battery pack includes: a battery pack tray with an open surface; a battery module accommodated in the battery pack tray; and a battery pack cover that covers the open surface of the battery pack tray.

The battery pack can be variously changed according to the required output and capacity. In particular, the battery pack can be effectively applied when packaging a secondary battery module. For example, the battery pack can be effectively applied not only to small mobile devices such as cell phones, PDAs, digital cameras, notebook computers, etc., but also to mid- to large-sized devices such as electric vehicles and hybrid electric vehicles.

Advantageous Effects

As described above, the battery pack cover according to the present invention effectively blocks the concentration of stress on a specific area, increases rigidity without adding a separate bracket, and facilitates an assembly process when packaging is applied.

BRIEF DESCRIPTION OF THE DRAWINGS

FIG. 1 is a front view of a battery pack cover according to an embodiment of the present invention.

FIG. 2 is an enlarged view of part A of FIG. 1.

FIG. 3 is a perspective view of a battery pack cover according to an embodiment of the present invention.

FIG. 4 is a front view of a battery pack cover according to another embodiment of the present invention.

FIG. 5 is a schematic diagram showing a simulation result of evaluating vibration performance for a battery pack cover according to an embodiment of the present invention.

FIGS. 6 to 8 are perspective views each illustrating a battery pack cover according to a comparative example.

DETAILED DESCRIPTION OF THE PREFERRED EMBODIMENTS

Hereinafter, the present invention will be described in more detail with reference to the drawings, but the scope of the present invention is not limited thereto.

FIG. 1 is a front view of a battery pack cover according to an embodiment of the present invention, FIG. 2 is an enlarged view of part A of FIG. 1, and FIG. 3 is a perspective view of a battery pack cover according to an embodiment of the present invention.

Referring to these drawings, the battery pack cover has a shape of a rectangular tray whose bottom direction is open to cover the top of the battery pack, and the battery pack cover has a structure that covers the battery pack tray in which the battery modules are accommodated. The battery pack cover may include a upper surface portion 100 that is plate-shaped and has bead-shaped recessed irregularities on one surface thereof; and a side portion 200 that is bent and extended from the upper surface portion 100, forms a plane perpendicular to the upper surface portion 100, and covers the upper side surface of the battery pack. In addition, the battery pack cover further includes a wing portion 300 that is bent and extended from the side portion 200 and forms a plane perpendicular to the side portion 200.

The irregularities formed on the upper surface portion 100 include a first shape 110 having a closed figure shape and a second shape 120 having an open figure shape based on a center line connecting the center in the width direction of the irregularities.

Referring to FIG. 2, the center line is a virtual line L obtained by calculating the center point of the length D in the width direction of the irregularities and connecting the center points. That is, the center line is a line that bisects the irregularities in the width direction to be equidistant from the edges of the irregularity, in which D1=D2, and the irregularities include an area in which the center line is a straight line (hereinafter, referred to as a straight line area) based on the center line. Here, the area in which the center line is a straight line means an area having a length in the width direction (D1 and D2) with respect to the center line extending in a straight line, and the irregularities are in a form where the center line is recessed as much as a straight area.

The first shape 110 forms a hexagonal structure having six sides when center lines connecting the centers in the width direction of the irregularities are connected. In addition, the first shape 110 further includes an irregularity that is perpendicular to the lower side of the hexagon. In addition, the second shape 120 forms a polygonal structure in which one side is open when center lines connecting the centers in the width direction of the irregularities are connected. The second shape 120 can be U-shaped with two sides that are at an angle to one another and a middle section extending between the two sides.

The straight line areas forming the first shape 110 and the second shape 120 do not face corners of the upper surface portion 100 (corresponding to the condition 1), and adjacently connected center lines of the irregularities in the width direction having a shape, in which two or more straight line areas are connected, face one or more different sides among four sides of the upper surface portion (corresponding to the condition 2). Therefore, the two centerlines, which form a V-shape, have an angle between them that is large enough that the centerlines point to opposite sides of the upper surface portion. For example, extensions of the centerlines of the two irregularities forming the left side of the first shape 110 intersect the upper edge and lower edge of the upper surface portion. In addition, at least one of the straight line areas has a shape in which both ends thereof face two adjacent sides among four sides each having the same upper surface portion 100 (corresponding to the condition 3). In other words, the centerline of the irregularity is at an angle so that extensions of the centerline intersect adjacent sides of the upper surface portion which meet at a corner. For example, each of the centerlines of the irregularities forming the sides of the first shape 110 and second shape 120 face two adjacent sides of the upper surface portion. Here, the two adjacent sides refer to sides that are adjacent to each other that share one vertex in the upper surface portion of a quadrangular shape.

A bead-shaped recessed portion in the form of a horizontal bar is formed in a central area of the upper surface portion 100 of the battery pack cover. The horizontal bar-shaped bead-shaped recessed portion is a central fastening portion 140 for fastening with a battery module mounted on the lower portion of the battery pack cover. The central fastening portion 140 has a bar shape crossing the upper surface portion 100 of the battery pack cover in the width direction, and the two central fastening portions 140 are formed to be spaced apart. A through hole 141 for fastening bolts is formed in the central fastening portion 140.

The shape of the irregularities formed on the upper surface portion 100 of the battery pack further includes one or more bead-shaped recessed portions 130 formed independently of the first shape 110 and the second shape 120. The bead-shaped recessed portions 130 are formed on both sides of the lower edge of the upper surface portion 100 of the battery pack.

The side portion 200 of the battery pack cover includes a corrugated structure oriented in a direction perpendicular to the upper surface portion 100. The corrugated structure of the side portion 200 includes irregularities that repeat protrusion and depression, and is arranged in a direction perpendicular to the upper surface portion 100.

In addition, the wing portion 300 has a structure in which a plurality of perforations 311 for fastening with a battery pack tray are formed.

FIG. 4 is a front view of a battery pack cover according to another embodiment of the present invention. In the battery pack cover shown in FIG. 4, irregularities having a shape of a closed figure are formed on the top and bottom, respectively. In the battery pack cover illustrated in FIG. 4, the remaining components except for the shape of the irregularities formed on the front portion are the same as the battery pack cover illustrated in FIG. 1. Detailed description of the remaining components will be omitted.

FIG. 5 is a schematic diagram showing a result of evaluating vibration performance for the battery pack cover shown in FIG. 1 through a simulation. Referring to FIG. 5, it can be seen that stress is distributed along the shape of the protrusion formed on the upper surface portion of the battery pack cover. Among the protrusions formed on the upper surface portion of the battery pack cover, it was confirmed that the stress was evenly distributed along the first shape and the second shape.

FIGS. 6 to 8 show a battery pack cover according to a comparative example, respectively.

FIG. 6 shows a structure in which a bead-shaped recessed portion in a quadrangle shape with rounded corners is formed on the front portion of the battery pack cover. FIG.

7 shows a structure in which a bar-shaped main recessed portion crosses the center of the front portion of the battery pack cover in the longitudinal direction, and a sub recessed portion radiating from the recessed portion toward an edge is formed. In addition, in FIG. 8, a plurality of recessed portions crossing the center of the battery pack cover in the longitudinal direction are formed, and each recessed portion has a rectangle extending in the longitudinal direction.

Hereinafter, the present invention will be described in more detail with reference to examples and the like, but the scope of the present invention is not limited thereto.

Examples 1 and 2

Battery pack covers of the shapes shown in FIGS. 1 and 4 were manufactured, respectively.

Comparative Examples 1 to 3

Each of the battery pack covers of the shapes shown in FIGS. 6 to 8 was manufactured.

Experimental Example: Evaluation of Vibration Performance for Battery Pack Cover Vibration performance evaluation was performed on the battery pack covers of Example 1 and Comparative Examples 1 to 3. In the evaluation, vibrations of various wavelengths were applied to each sample, and a range in which cracks occurred was calculated. The evaluation results are shown in Table 1 below.

TABLE 1

| Example No. | Evaluation result (Hz) |
| --- | --- |
| Example 1 | 39.4 |
| Comparative Example 1 | 18.6 |
| Comparative Example 2 | 32.9 |
| Comparative Example 3 | 35.1 |

Referring to Table 1, the battery pack cover according to Example 1 exhibits a result of vibration performance improved by two or more times compared to Comparative Example 1. In addition, compared to Comparative Examples 2 and 3, it can be seen that the battery pack cover of Example 1 has remarkably excellent vibration performance.

DESCRIPTION OF REFERENCE NUMERALS

100: upper surface portion
110: first shape
120: second shape
130: recessed portion
140: central fastening portion
141: through hole
200: side portion
300: wing portion
311: through hole

The invention claimed is:

1. A battery pack cover in a form of a square tray to cover an upper portion of a battery pack, the battery pack cover comprising:
    a plate-shaped upper surface portion having irregularities, the irregularities being either recesses or protrusions on the upper surface portion; and
    a side portion bent and extended from the upper surface portion, forming a plane perpendicular to the upper surface portion, and covering an upper side surface of the battery pack,
    wherein the irregularities formed on the upper surface portion include portions in which a center line of each portion is a straight line, and
    wherein the irregularities satisfy following conditions 1 to 3:
    [Condition 1]
    one end of the center line of at least one portion faces one of four sides of the upper surface portion, and an opposite end of the center line faces another side so that an extension of the centerline does not intersect a corner of the upper surface portion;
    [Condition 2]
    the center line of each of two portions are connected, and the connected center lines face two opposite sides of the upper surface portion; and
    [Condition 3]
    a centerline of at least one portion faces two adjacent sides among four sides of the upper surface portion.

2. The battery pack cover of claim 1, wherein each of the irregularities formed on the upper surface portion has a bead-shaped recessed shape, and
    wherein the irregularities are formed on an upper surface of the plate-shaped upper surface portion.

3. The battery pack cover of claim 1, wherein the irregularities formed on the upper surface portion comprise:
    a first shape having a closed figure shape; and
    a second shape with an open figure shape.

4. The battery pack cover of claim 3, wherein the first shape forms a polygonal structure with four or more sides when connecting the center lines of the portions of the irregularities.

5. The battery pack cover of claim 4, wherein the first shape further includes one or more irregularities perpendicular to a side of the polygon on at least one of sides of the polygon.

6. The battery pack cover of claim 3, wherein the second shape forms a polygonal structure with one side open.

7. The battery pack cover of claim 1, wherein the irregularities formed on the upper surface portion do not contact the sides of the upper surface portion.

8. The battery pack cover of claim 1, wherein a width of the irregularities is in a range of 5 to 35% of a length in a short axis direction of the upper surface portion.

9. The battery pack cover of claim 1, wherein an area having irregularities formed thereon is in a range of 30 to 65% of a total area of the upper surface portion.

10. The battery pack cover of claim 3, wherein a ratio of an area of the first shape and an area the second shape is in a range of 3:1 to 1.2:1.

11. The battery pack cover of claim 1, further comprising one or more bead-shaped recessed portions formed independently of the irregularities formed on the upper surface portion.

12. The battery pack cover of claim 1, wherein the side portion includes protrusions and depressions, and
    wherein a valley formed by the protrusion and depression is perpendicular to the upper surface portion.

13. The battery pack cover of claim 1, further comprising a wing portion extending from the side portion and forming a plane perpendicular to the side portion,
    wherein a perforation for fastening with the battery pack or a battery pack tray is formed in the wing portion.

14. A battery pack comprising: a battery pack tray having an open surface;
   a battery module accommodated in the battery pack tray; and
   the battery pack cover according to claim 1, having a structure covering the open surface of the battery pack tray.

15. The battery pack cover of claim 1, wherein the irregularities form a first shape, the first shape being hexagonal, and a second shape, the second shape being U-shaped, and
   wherein an area of the first shape and the second shape is 30 to 65% of an area of the upper surface portion.

16. The battery pack cover of claim 1, wherein a ratio of an area of the first shape and an area the second shape is in a range of 3:1 to 1.2:1.

* * * * *